March 1, 1938.　　　　　A. MADLÉ　　　　　2,109,845
POWER TRANSMISSION MECHANISM
Filed July 23, 1932　　　3 Sheets-Sheet 2
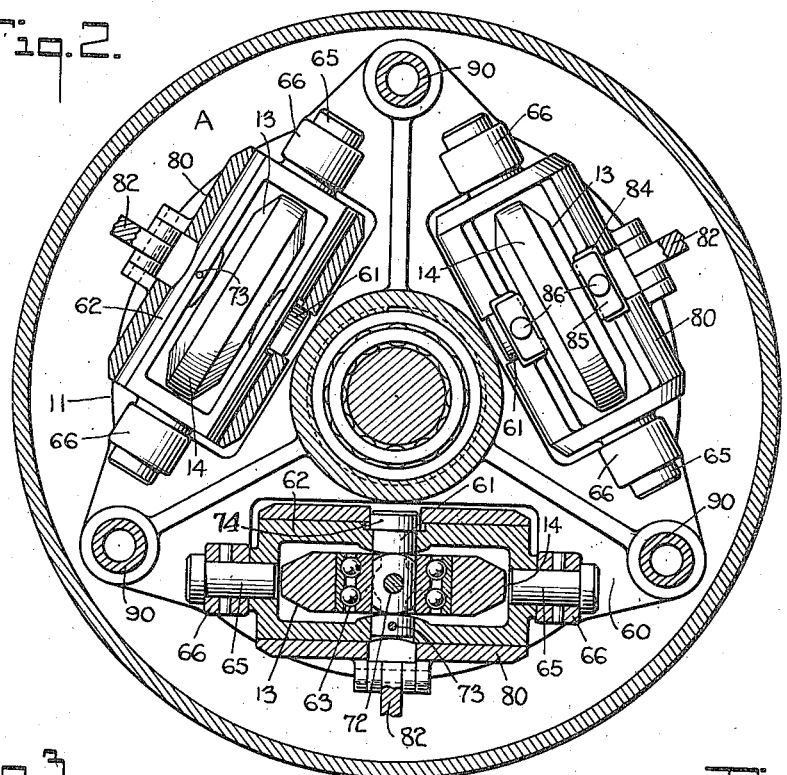
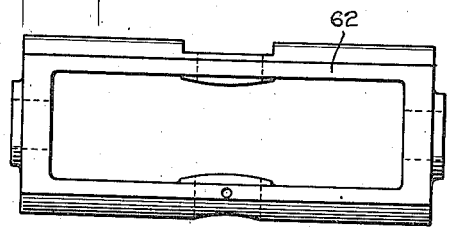
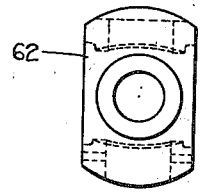
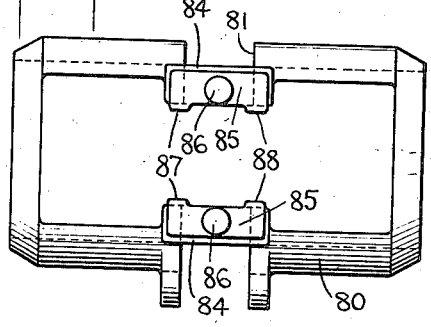
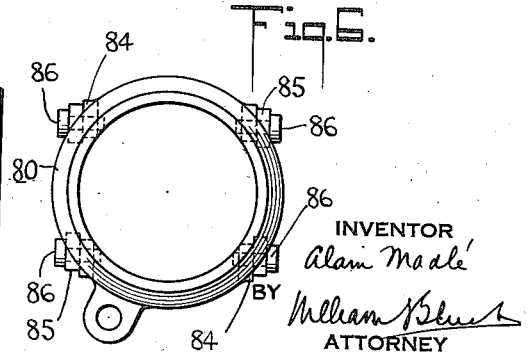

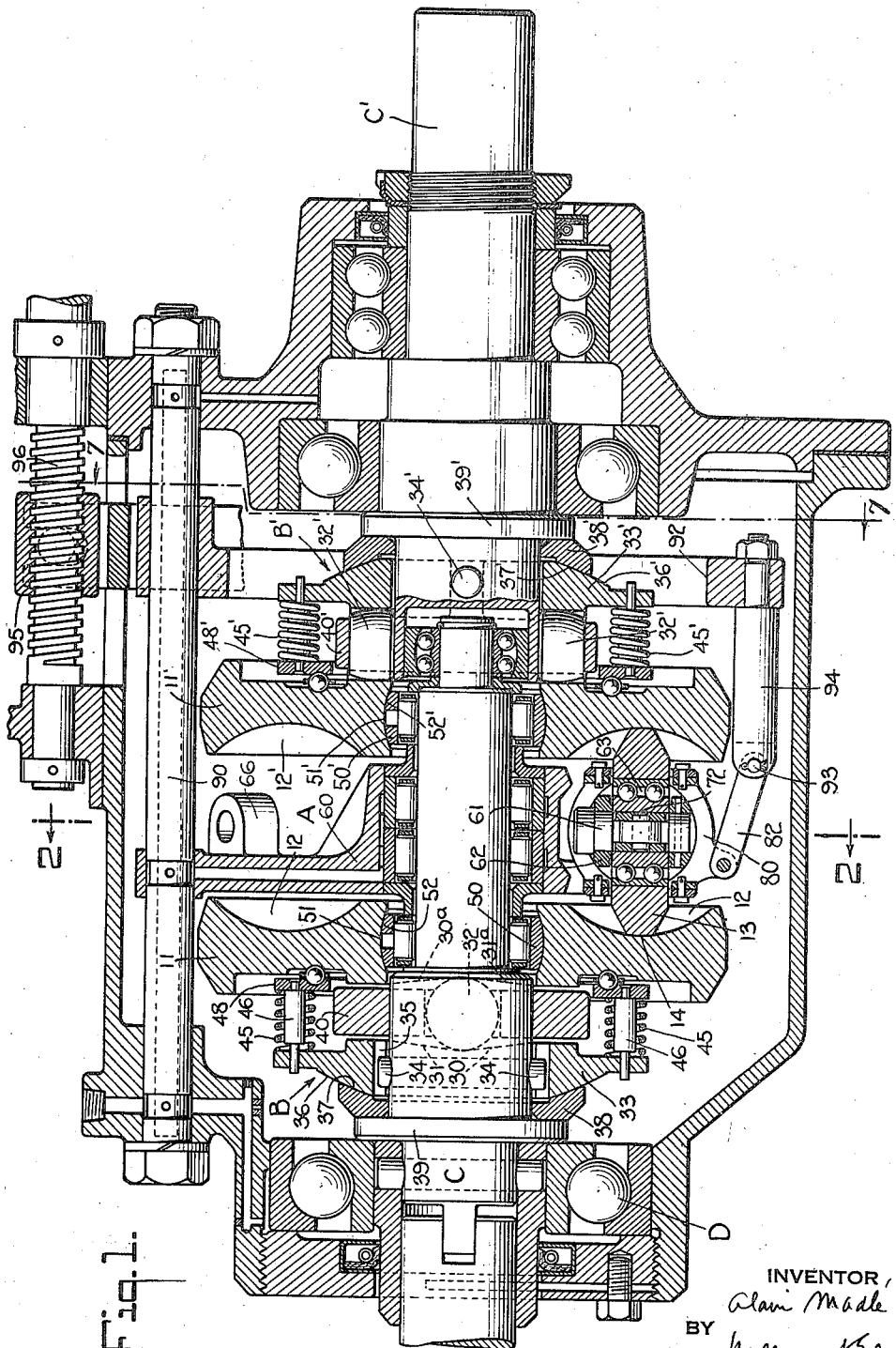

March 1, 1938.  A. MADLÉ  2,109,845
POWER TRANSMISSION MECHANISM
Filed July 23, 1932  3 Sheets-Sheet 3
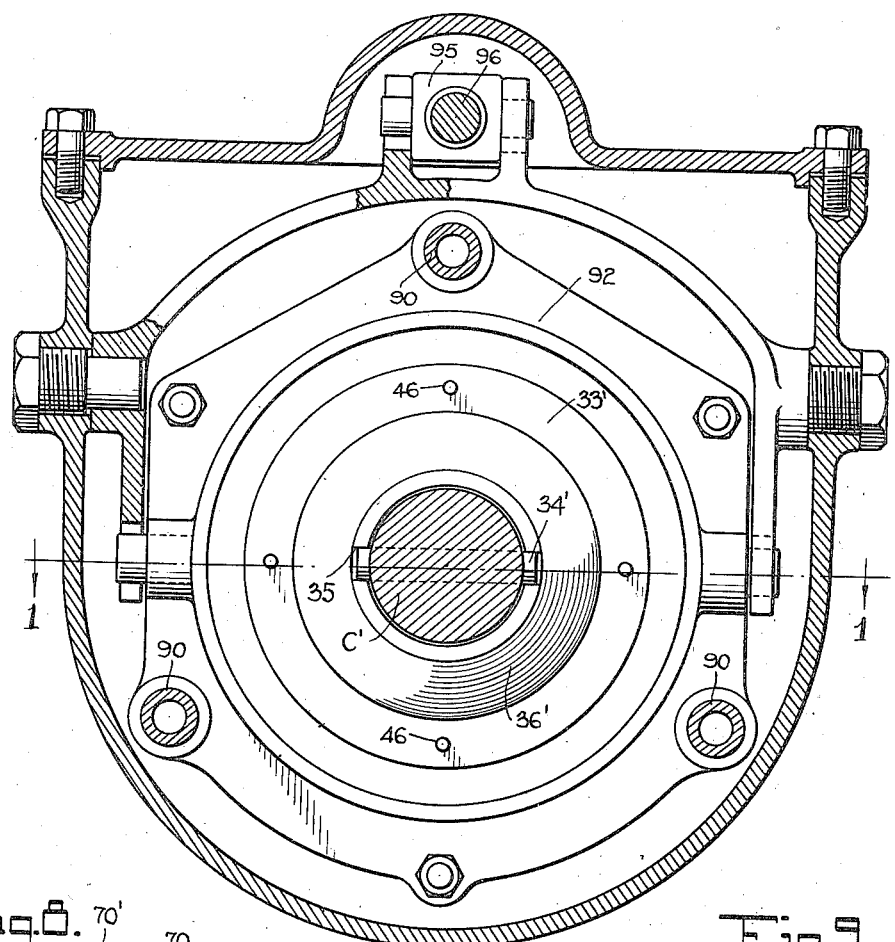
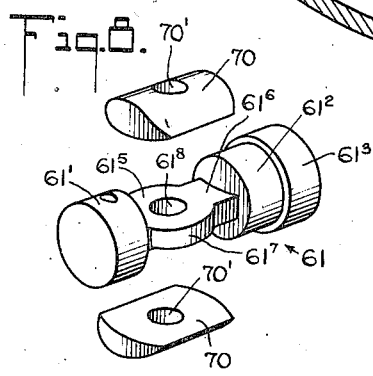
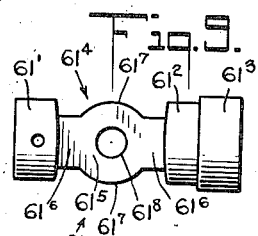
INVENTOR
Alain Madlé
BY
William Blush
ATTORNEY Patented Mar. 1, 1938

2,109,845

UNITED STATES PATENT OFFICE 2,109,845

POWER TRANSMISSION MECHANISM

Alain Madlé, New York, N. C., assignor to Erban Operating Corporation, New York, N. Y., a corporation of New York Application July 23, 1932, Serial No. 624,241

19 Claims. (Cl. 74—200)

This invention relates to power transmission mechanisms of the type in which there is employed a transmission system having a continuous adhesive operative connection between the driving and driven members, and I have, therefore, herein disclosed my invention as embodied in an adhesive system comprising races and rolling bodies. It will be understood, however, that as to features of my invention capable of more general application, my invention is not to be so restricted, unless the language of the claims specifically calls therefor.

A power transmission employing adhesive contact must employ some arrangement for applying at the points of contact a pressure correctly proportioned to the load. In arrangements to which this invention has reference, such pressure is in the form of an axial component developed from the torque by a converting device, to be hereafter referred to as "a torque-loading device", and through which the axial component is delivered and applied to the adhesive systems.

Where such torque-loading device is constructed and related so as to be immediately responsive to changes in the torque and to develop at the points of adhesive contact the correct pressures without any substantial time lag, as where the torque-loading device is positioned intermediate of the source of such torque changes and such points of adhesive contact, such an arrangement will be effective, for the purposes above set forth, only where the impacts or shocks are transmitted to the adhesive system through the torque-loading device and will not be effective for shocks or torque changes originating elsewhere and not so transmitted, because such changes being delivered directly to the points of adhesive contact, will break the adhesive control of the system and will not be transmitted to the torque-loading device for compensation therefor by it in the absence of special provision, and the adhesive contact will remain broken until restored from the other side.

Where I have attempted to avoid the breaking of the adhesive contact when shocks originate at such opposite end of the system by employing any arrangement which will apply a constant pressure to the system to counteract the shock, such means will fall short of the desired aim in that, as the increased torque or the shock is transmitted first to the points of adhesive contact and then through these points to the torque-loading device to generate the required pressure, which is then transmitted back to the points of contact, the time lapse (hereinafter referred to as the time lag) between the application of a shock to the points of contact and the compensation therefor at such points, no matter how short, will be sufficient to break the driving connection, if the shock is sufficiently sudden. Furthermore, the employment of such a contact pressure applying means, to supplement the torque-loading device, for the purposes suggested, entails the application at all times to the points of adhesive contact, of a pressure in excess of that required, an excess which increases as provision is made for compensating for shocks of increased gradients.

In my invention, I provide, in connection with a power transmission by adhesive contact, an arrangement whereby the system will not only be immediately responsive to changes in the power input where the load remains constant, but will also make proper provision for changes in the load, and in the illustrated embodiment will compensate therefor so that regardless of the end at which the change takes place, and regardless of the rapidity of the change, and even though the change may take place simultaneously at both ends, the pressure at the points of contact will always respond immediately to such changes, so that a time lag in the compensation for the changes will be eliminated, and that therefore the optimum for such a system, namely, that the pressure at the points of contact shall at all times be that which is required, will be attained in fact, and all this without the application of an overloading pressure to the adhesive system.

In accordance with the arrangement herein disclosed, I provide, in addition to a torque-loading device positioned to one side of the points of adhesive contact for causing the system to be immediately responsive to torque changes originating to that side, an arrangement at the other side of the system responsive to torque changes originating to that side, so that from whichever side the change in the flow of torque is received, the arrangement responsive to such change for compensating therefor, will be on that side for such purpose.

In transmission systems employing points of adhesive contact now known to me, the torque-loading device or its equivalent, is positioned to one side of the points of contact, and the self-alignment of the system, secured for example by making one of the races self-aligning in one of the race rings, about a center removed from and to one side of a point centrally located with reference to the points of adhesive contact, and the study of such an arrangement will show that there is in it, what might be called an "unbalance" in the alignment.

It is one of the objects of my invention to provide an arrangement whereby the self-alignment of the parts shall be so related to the points of adhesive contact that the resultant thereof will be as if they had been concentrated at a point centrally located between the points of adhesive contact where a number of such points are used, and I attain this object in the embodiment herein disclosed by making both of the race rings, which serve to define the points of contact, self-aligning. Thus, an adhesive transmission system is developed which will be truly balanced for purposes of self-alignment, the balance being truly symmetrical with reference to the points of adhesive contact, and therefore as if a single theoretical point of contact were employed.

In the drawings, I have shown the employment of a plurality of torque-loading devices in opposed relation with reference to the adhesive system, one torque-loading device being to one side of the system and associated with one race ring, and the other to the other side and associated with another race ring. Each of the torque-loading devices is made so as to permit of the self-alignment of the race ring with which it is associated. It will be observed that by this arrangement I attain (a) the balanced self-alignment of the system about a point symmetrically thereof, and (b) the immediate responsiveness to and compensation for all torque changes no matter where or with what suddenness they originate.

By the employment of opposed torque-loading devices positioned and devised as shown in the drawings, I attain additionally a mechanical symmetry and a true reversibility, not only from the standpoint of load application, but also from that of installation.

While I have shown and will describe an embodiment which accomplishes all my objectives, it will be understood that embodiments may be usefully employed which will give not all the objectives, but only some of them.

In transmission of the adhesive type employing contacting elements such as races and rolling bodies, the variation of the relative rate of rotation of the member of the system is generally accomplished by shifting the rolling bodies to vary the leverage between the members.

It is a further general object of my invention to provide a new and improved arrangement whereby this change can be accomplished with a reduction in the factors of friction from those which are generally present in all of the systems of which I am aware.

For the attainment of these objects and such other objects as may hereinafter appear or be pointed out, I have illustrated an embodiment of my invention in the drawings, wherein:

Figure 1 is a longitudinal cross-section and through the main axis of the rotating members, and taken on line 1—1 of Figure 7;

Figure 2 is a section on line 2—2 of Figure 1 and illustrates the mounting of the transmission rollers of the variable speed transmission;

Figure 3 is an elevation of one of the roller frames which serves to carry one of the transmission rollers;

Figure 4 is an end view of the roller frame as shown in Figure 3;

Figure 5 shows in elevation the control frame by which the transmission rollers are shifted for the purpose of changing the speed ratio;

Figure 6 is an end view of the control frame shown in Figure 5.

Figure 7 is a sectional view on line 7—7 of Figure 1 showing more particularly the details of the control system for the variable speed mechanism;

Figure 8 is an exploded view in perspective of the pin, which serves as the transmission roller axle, and certain parts associated with it, and Figure 9 is a horizontal cross-section through this same pin as shown in Figure 8.

Before proceeding to describe my improvements, I will premise that in the embodiment illustrated in the drawings, they are shown as applied to a transmission system (A in Figure 1) comprising races 11 and 11' each provided with the toric face 12 or 12' (hereinafter referred to as "race-ways",) positioned in symmetrical opposed relation, and rolling bodies shown as in the form of rollers 13, received between them and each provided with an annular surface of contact 14.

My invention in one of its features involves (a) a new and improved arrangement whereby the pressure applied at the points of adhesive contact is always that which is required regardless of, at which end the torque is applied or from which end the torque change originates, or what may be the gradient of the torque change, and (b) a new and improved arrangement whereby the alignment of the system where provided for, is about a plane that is truly the resultant of all the points of contact, and symmetrical with reference thereto.

In the drawings, I have illustrated the new and improved arrangement (a) and the new and improved arrangement (b) as embodied in the same mechanism functioning as and for the purposes set forth above. It will be understood, however, that my invention is not to be limited either to the incorporation of both into a unitary mechanism, or that any unitary mechanism when employed shall be so constructed and devised as to perform at one and the same time the functions set forth in both (a) and (b), unless the language of the claims specifically calls for either or both of these.

Upon viewing Figure 1 of the drawings, I show at the left a rotating member C, and at the right a rotating member C', either of which may serve as the power input or driving member, in which event the other will serve as the power output or driven member, and it will be understood, as this description is read, that it is immaterial which is the driven member, and which is the driving member, and one can be the driving member for one moment, and the other the driving member at another moment. In fact, as will appear, it is an important feature of my invention that my structure is so devised.

However, for purposes of convenience of description herein, the rotating member C will be assumed to be the power input member, that is the driving member, and the member C' will be assumed to be the power output member, or the driven member, although it will again be emphasized that this is only for the purpose of convenience or reference.

A system of this character employing as it does a driving member and a driven member, and an interposed transmission for transmitting power from one to the other by means of adhesive contact, requires the employment of an arrangement for developing an axial component from the applied torque and for applying this component either directly or otherwise to the points of adhesive contact so as to establish the drive for power transmission purposes, such arrangement being hereinafter referred to as a torque-loading device.

Upon viewing Figure 1 of the drawings, it will here be observed, that I have illustrated the employment of such a torque-loading device at B and to the left of the transmission and of a second torque-loading device at B', and to the right of the transmission. Both of these torque-loading devices have been illustrated in the drawings as substantial duplicates, both in their structural details and in their positional and functioning relationship, and therefore the description of one by means of reference numerals, will serve also for the other, except that in the case of said other, the same reference numerals will be with the addition of priming. It will be, however, understood that this feature of my invention does not necessarily call for the torque-loading devices B and B' being exact or substantial duplicates, as any two torque-loading devices functioning generally as herein intended, will serve the purposes intended. However, certain advantages do result from the exact duplication of the torque-loading devices.

I will now proceed to describe in full detail the construction and relationship, and the functioning of the torque-loading member B at the left, although it will be understood that the details as herein disclosed relate only to the structure illustrated in the drawings, and may be varied within the limits permitted by my invention.

The axial component delivered by the torque-loading device B to the points of adhesive contact is developed between sets of pairs of opposed and cooperating inclined surfaces 30, 30a, and 31. As many of these sets of inclined surfaces may be employed in the torque-loading device B as it may be found necessary or desirable, although two are sufficient to serve my purposes. Between each set of such inclined surfaces, is received the rolling body 32, and it will here be stated that I have found it desirable to employ rolling bodies at all points of frictional contact in my system so as to eliminate the introduction into the functioning of the system of a coefficient of friction which is not constant, and which, therefore, can not be calculated for.

The inclined surfaces 30, 31 are shown as formed on the inner face of a pressure member 33, and the cooperating inclined surfaces 30a and 31a are shown for purposes of this embodiment as formed on the outer surface of race ring 11. The pressure member 33 is in the form of a ring so received on the shaft that while it rotates with the shaft, it will be able to move relatively thereto, but within the limits permitted by its manner of association and support.

This ring 33 is shown in the drawings as loosely keyed on the shaft, as by means of the oppositely directed projections 34, formed in the illustrated embodiment at the extreme ends of a pin transversely received through the shaft, and freely received in the opposed axial grooves 35 formed on the inner bore of the ring 33.

This ring 33 has its outer surface 36 abutting against the inner surface 37 of a collar 38 which in turn is in abutting relation to a member 39 which can be associated with the shaft in any preferred or desired manner so as to serve as a thrust abutment. The cooperating surfaces 36 and 37 are both made spherical and conform to the same radius of curvature and the same center, which is located intermediate the races. The loose keying of the ring 33 on the shaft and the spherical bearing surfaces 36 and 37, serve to permit the ring to have a free universal movement on the shaft for the purpose that will appear hereinafter.

The character of the rolling bodies 32 illustrated in the drawings will be understood by a comparison of the showing in the torque-loading device B at the left with their showing in the torque-loading device B' at the right.

For taking up the thrust reaction of the axial component developed by the torque-loading member that is directed toward the input end, I show the angular contact ball-bearing shown at D to the left.

The rolling bodies 32 of the torque-loading device may be supported in any preferred or desired manner to serve their purpose as, for example, by the cage member 40 loosely received between the members 33 and 11 and in turn loosely carrying the rolling bodies 32.

For maintaining the transmission system, comprising as it does the races 11 and 11' and the transmission rollers 13, in assembled relation, I may, if desired, employ a means for applying a pressure sufficient, however, only for this purpose, as for example, by means of springs 45 in abutting relation to the members 11 and 33 and supported around the member 46, which is carried at one end from the ring 33 by means of a projecting pin and similarly carried at the other end in a ring 48, in ball-bearing relation to the other surface of the race ring 11.

From the description thus far given, it will be understood that where a torque or a change in the torque occurs at the end C, such torque will manifest itself in the change of the pressure developed by the torque-loading member B, B, and because of the characteristics of the system herein disclosed, and particularly the character of the inclined surfaces 30, 30a and 31, 31a, and the self-aligning character of the mounting for the ring 33, that pressure will always be developed and equally distributed to the points of contact of the rolling bodies 32 of the torque-loading member and the race ring 11 which is required by the load, and it will shortly be pointed out how the pressure so developed will be directly transmitted to the points of contact of the rolling bodies 13 and the race rings 11, 11', also always in proportion to the load.

To provide for the self-alignment of the race ring 11, so as to make the entire system including both the torque-loading member and the race ring, self-aligning, I show in Figure 1 this race ring as bearing upon the ring 50 by means of the spherical contacting surfaces 51 and 52, so as to support this race ring also for a universal adjustment. As a result of this arrangement, the pressure developed by the torque-loading member B, equally distributed to the points of contact between the torque-loading member and the race ring 11 as already set forth, is delivered by the race ring to the points of adhesive contact between the race ring 11 with the rolling bodies 13, also under conditions which compel the equal distribution of the pressure upon such points of contact.

I have already stated that in the illustrated embodiment, I show the torque-loading member B', at the right, as a substantial duplicate of the torque-loading member B at the left, and that the corresponding parts in the former have been given the same reference numbers as those in the latter, except that such reference numbers have been primed, and it is, therefore, believed that with this statement, the description already given of the torque-loading member B, will suffice for the torque-loading member B', and that a detailed description of B' will be repetitious. However, attention is invited to the fact that the torque-loading member B', like the torque-loading member B, is so constructed and devised as to be capable of universal adjustment, and self-aligning, and that it will deliver to the race ring 11' the pressure equally distributed to the points of contact therewith.

The race ring 11' is also supported upon a bearing 50' by means of the spherical surfaces 51' and 52', so that the pressure so delivered to that race ring 11' by the torque-loading member B', will be equally distributed and applied to the points of adhesive contact of that race ring with the rolling bodies 13.

Depending upon which of the members C and C' is driven at a particular movement, the torque-loading member B or B' associated with that member and positioned to that side of the transmission system, will serve to take care of the varying inputs of torque from the driving end, so as to give at the points of adhesive contact that pressure which is always required for the changed condition. Under such conditions the pressure requirements for any shocks or changes in torque which may occur from the other end, namely, the driven end, will be taken care of by the other torque-loading member. My system has, therefore, been so devised as to be immediately responsive to any torque changes no matter at which end it originates, or no matter how rapidly it is effected, and even where torque changes originate simultaneously at both ends.

It will therefore be seen that, by my arrangement, that pressure will be produced at the points of contact between the races and the rolling bodies, which is required for the particular torque being transmitted, and this pressure will always vary with and be immediately responsive to any change in the torque no matter where or how suddenly such change originates, so that the proportionality of the pressure to the torque is always maintained, and therefore, the pressure will in fact always be that required, and this I attain by giving to parts of the mechanism the following characteristics: (a) The torque-loading means are so devised as to develop always the proper axial component; (b) the axial component is applied in its entirety to the points of adhesive contact; (c) rolling contacts are employed generally throughout, so as to establish an approximately constant friction condition for all operating states; (d) torque loading means are interposed between the transmission and all points where torques and torque changes might originate, so that such torques and torque changes are first delivered to said means; (e) the transmission system is made self-aligning and the other associated parts are so devised and related to the transmission means as to permit of the automatic self-alignment of the system, and (f) the transmission system is made automatically self-aligning about a point which is the resultant of all the points of adhesive contact, to give equal distribution of the pressure on all such points.

To the extent to which the system embodies or has associated therewith the characteristics above outlined, to that extent will it approximate the optimum.

My invention in another of its features, relates to an arrangement for controlling the shifting of the points of adhesive contact for speed ratio change purposes where rollers are employed as the rolling bodies, and before describing the herein disclosed specific embodiment of this feature, I will premise that I have shown, for purposes of illustration only however, the employment of three rollers to establish the adhesive contact, all having surfaces generated for purposes of proper contact with the surfaces of the races, and that these rollers are supported for always assuming the same angular tilt and when shifted therefrom to be shifted simultaneously to the same extent.

For the purpose of not impairing the proper adhesive contact as the rollers 13 are tilted, the contact surfaces 14 of the rollers 13 are of a transverse radius not in excess of, and preferably smaller than, the radius of the transverse curvature of the toric surfaces 12 and 12', and the center of the rollers are shown as in the locus or path of the center of the circle that generates the toric surfaces 12 and 12'.

Upon viewing Figures 1 and 2 of the drawings, it will be observed that the rollers 13 are so carried by a cage 60, that the rollers are free to tilt for the purposes of shifting their points of contact with the races, and for this purpose I provide an arrangement for each roller which comprises a pin assembly 61 carried by a frame 62, the roller being carried from the pin assembly 61 for free rotation thereabout by means of the ball-bearings 63. The frame 62 is shown of open construction so as to permit of the engagement of the race rings by the surface 14 of the roller for establishing the drive. The frame 62 is mounted for pivotal movement about an axis diametric of the roller and perpendicular to the axis through the contact points of the roller, as by means of pins 65 about which the frame 62 swivels. The pins 65 in turn are mounted in ears 66 (see Figure 2) fixedly related to and carried by the cage 60.

From the description thus far given, it will be understood that each of the rollers 13 is free to tilt along with its frame with reference to the race rings.

To change the tilt of the rollers 14 for speed ratio change purposes by a bodily transverse movement of the points of contact of the rollers across the face of the races, or in fact by any movement other than rolling movement, will introduce friction factors which will materially affect the operating efficiency of the mechanism and I, therefore, show the employment for speed change purposes of an arrangement whereby each roller is first given a turning movement about an axis diametrically through its points of adhesive contact with the races, to position each roller angularly of its normal path of travel, so that as the races rotate, the rollers will assume a new transverse position by a rolling movement.

My arrangement contemplates that this angling of the rollers shall not require initiation by a movement of the roller-carrying frame 62, and further that the restoration of the rollers to its new normal position shall also be independent of the frame 62.

I will now describe (1) my arrangement whereby each roller can be given an angular movement about an axis diametrically of its points of adhesive contact and independently of the frame and (2) my arrangement whereby such angular movement is controlled for initiation, maintenance and restoration.

Reference is made to the detailed showing of the construction of the pin assembly 61 in Figures 8 and 9 wherein this pin is shown as made up of the cylindrical sections 61' and 61², the enlarged head 61³, and the connecting webbing 61⁴. This connecting webbing is shown in the drawings in its most detailed embodiment, as flattened to provide two opposed plane faces 61⁵ and connected to the cylindrical portion 61' and 61² by the constricted neck portions 61⁶. The side walls of this connecting web 61⁴ are curved as shown at 61⁷ for the purposes that will appear. The pin structure is completed by the segments 70, 70 so contoured as to be seated upon the plane surfaces 61⁵, and to have their outer surfaces conform to the cylindrical conformation of the cylindrical sections 61' and 61². The pin assembly 61 thus far described, therefore, in effect is generally cylindrical throughout, except that recesses are provided in such cylindrical surfaces defined by the side walls 61⁷.

The cylindrical segments 70, 70 and the connecting webbing 61⁴, are bored to provide the openings 61⁸ and 70', to be brought into registration, when the cylindrical segments are seated as above referred to, and through their registering opening is received the pin 72 about which the cylindrical segments may pivot. The segments have their end faces properly conformed to permit of this pivotal movement.

It is contemplated by me that the plane surfaces 61⁵ of the connecting webbing 61⁴ shall be fixed in a plane which is parallel to that defined by the axis of the pins 61 and 65, and this I do by means of cotter pins shown at 73 engaging through the pin 61 and the frame 62.

Each roller 13 bears directly upon the cylindrical segments 70 and, therefore, can take a tilting movement with reference to the pin 61 and with reference to the frame 62, this tilting and with reference to the frame 62, this tilting movement being performed about the axis of the pin 72.

From the description thus far given of the details of construction of the pin 61, of its relationship to the frame 62, and of the bearing relationship thereto of the rollers 13, it will be seen that the rollers can angle with reference to the frame 62 about the axis of the pin 72; that the axis of this pin 72 is diametrically through the points of adhesive contact of the roller 13 and the races; that the aforementioned angling movement permitted to the rollers 13, will be restricted however to an angling movement about an axis diametrically of the points of adhesive contact, and that in the specific embodiment herein illustrated, no movement of the roller 13 with reference to its frame 62 is permitted other than about the axis aforementioned.

My arrangement whereby the angular movement to be given to the roller, is controlled for initiation, maintenance and restoration, is shown in Figures 1, 2, and 5 of the drawings and comprises generally means movable relatively to the frame 62 for causing the application selectively of pressure to the roller to one side of the axis through the contact points in accordance with the requirements, and in Figure 5 I show the control member through the operation of which such pressure is caused to be applied, as in the form of a skeleton frame 80 rotatably bearing about the frame 62 (see lower roller in Figure 3). The control member 80 is guided to a straight rotary motion about the frame 62, by means of the enlarged head 74 of the pin 61, which is received in a diametrically positioned slot 81, and is given this straight rotary motion by a control lever 82, engaged therewith as more fully shown in Figures 2 and 6 of the drawings, to angle the roller by the construction, and in the manner now to be pointed out.

The aforementioned selective application of pressure to the roller, is by means of the elements 85 controlled in their operation by the control member 80, and for this purpose the elements 85 are shown as carried by the control member as, for example, in the manner shown in the drawings in which they are illustrated as pivoted at 86 to flanges 84. The selectivity of the application of the pressure to the roller is attained by employing at least two such members 85, one to each side of the roller and preferably in opposed relation and by so designing these members as to provide them each with a plurality of points of pressure application with the roller as shown at 87 and 88 and positioned on opposite sides of the pivot 86, whereby, as will be pointed out, the direction of movement of the control member 80 will determine which of the members 85 is moved into contact with the roller and the direction of movement of said roller will determine through which pressure point of the member selected, the angling movement will be effected.

The roller frames 62 and their attendant and associated parts are all supported from the roller carrier or cage 60 which bears about one of the rotating members C or C', as shown in Figure 1, and is held against rotation in any preferred or desired manner as, for example, by means of the stay bolts 90 engaging through outer portions of the cage.

The speed ratio control levers or links 82 operating the control members 80, are in turn operated simultaneously and in unison by the regulating disk 92, to which each of the links 82 is connected as by a pivot 93 and a bolt 94 which is shown as fixedly associated with the disk 92. The disk 92 in turn is supported for rectilinear movement along the axis of the transmission in any preferred or desired manner as, for example, by being associated with and carried by the bolts 90, already referred to in connection with the cage 60.

The rectilinear movement may be imparted to this controlling disk 92 in any preferred or desired manner as, for example, by the threaded engaging members 95 and 96, the latter being operated in any desired or preferred manner.

From this description of the speed ratio changing apparatus, it will be understood that any movement given to the operating member of which the worm 96 is a part, will impart either backward or forward movement to the controlling disk 92 which in turn will cause the links 82 to either push or pull the controlling members 80 to rotate these controlling members in one direction or the other, and that this movement of the controlling members 80 will bring the elements 85 on one side or the other of each roller, into contact with that roller, and upon such contact, the rotation of the roller in one direction will automatically cause the advanced pressure point 87 or 88, as determined by the direction of rotation of the roller to be pushed out of contact with the roller, and the remote pressure point to be pushed into contact with the roller, and upon a continued application of this movement to the disk 92, the aforementioned active contacting pressure applying point will move the roller angularly to increasing extents. Due to this change in its angular position, the roller will roll diagonally across the face of the races to change its tilt, and will carry with it in such change the frame 62 by which it is supported.

The controlling member 92 is moved, as set forth, until a tilt of the rollers is reached to give the desired speed change. When the controlling disk stops moving, however, the rollers will still continue to move diagonally and in such movement will move away from that pressure-applying element 85 which has been causing it to angle, and will move into contact with the pressure applying element on the other side of the roller, and in such movement will act in connection with the two points of pressure application 87 and 88 on that side, the same way as it did as to the first mentioned pressure-applying element 85 in connection with the initiation of the movement to cause a restoration of the rollers to a position in the normal path of their travel.

It will thus be seen that my arrangement for changing the speed ratio is so devised that the angling of the rollers for this purpose is through means which operate or move independently of the roller-supporting frames, and that in the diagonal rolling movement of the rollers induced by this angling, the roller-supporting frames will be caused to follow. In this way, the operation of the speed change does not require the operation of the frames 62 with the disadvantages that such an arrangement gives.

Having described my invention what I claim as new, and desire to secure by Letters Patent, is:

1. In a device of the character described, in combination, a plurality of torque transmitting members, operative connections between said members comprising a system of coaxial, toric races and rolling bodies for transmitting torques from one member to the other arranged symmetrically about the axis of the races and in adhesive rolling contact with said races, and means responsive to the torque of one of said members for applying pressure thereto, a universal mounting for each of the races of said system whereby they are automatically self-adjustable so as to produce a uniform pressure on all points of contact between the races and the rolling bodies.

2. In a system for transmitting power from a driving to a driven member, in which the transmission is effected by the rolling adhesive contact of rolling bodies with races, a carrier for said rolling bodies, means for changing the position of the rolling bodies with relation to the races in order to vary the speed ratio of the transmission, said means comprising members engaging each of said rolling bodies on opposite sides thereof and on opposite sides of the axis of rotation thereof for the purpose of effecting angular movement thereof about an axis through the points of adhesive contact, and an element movable independently of the rolling bodies and their carrier, said element carrying the aforesaid members, whereby when said element is moved, said means will engage the rolling bodies and cause them to shift their axes so as to change the speed ratio of the transmission.

3. In a system for transmitting power from a driving to a driven member, in which the transmission is effected by the rolling adhesive contact of rolling bodies with races, a carrier for said rolling bodies pivotally mounted on a relatively stationary frame and having the rolling bodies journalled therein, means for changing the position of the rolling bodies with relation to the races, in order to vary the speed ratio of the transmission, said means comprising pivoted members engaging each of said rolling bodies on opposite sides thereof for the purpose of effecting angular movement thereof about an axis through the points of adhesive contact, and an element movable independently of the rolling bodies and their carrier, said element carrying the aforesaid members, whereby when said element is moved, said means will engage the rolling bodies and cause them to shift their axes of rotation so as to change the speed ratio of the transmission.

4. In a system of adhesively contacting toric races and rollers, a relatively stationary roller carrying frame, a carrier for each of said rollers trunnioned within said frame, a bearing member carrying the rollers in rotatable relation thereto, and positioned within said carrier and adapted to be rotated relatively thereto and to pivot about an axis passing through the points of contact of said races and rollers, and a control member adapted to pivot about said carrier and a pair of forked elements pivotally carried by said control member and adapted to engage the roller on opposite sides thereof, and the elements of each pair engaging the roller on opposite sides of the axis of rotation thereof, whereby when said control members are inclined, the roller will be angled about an axis passing through the points of contact of said races and rollers, and whereby the plane of rotation of said roller will be caused to change so as to vary the speed ratio.

5. In a system for transmitting power from a driving to a driven member, in which the transmission is effected by the rolling adhesive contact of rolling bodies with races, a carrier for said rolling bodies, pivotally mounted on a relatively stationary frame and having the rollers journalled therein, means for changing the position of the rolling bodies with relation to the races, in order to vary the speed ratio of the transmission, said means comprising pivoted members engaging each of said rolling bodies at points on opposite sides of the axis of rotation of said rollers and on opposite sides of said rollers at each of said points for the purpose of effecting angular movement thereof about an axis through the points of adhesive contact, and an element movable independently of the rolling bodies and their carrier, said element carrying the aforesaid members, whereby when said element is moved, said means will engage the rolling bodies and cause them to shift their axes of rotation so as to change the speed ratio of the transmission.

6. In a device of the character described, a plurality of torque-transmitting members, and operative connections between the same comprising a system of races and rollers in adhesive contact therewith for transmitting torques from one member to the other, means for varying the transmission ratio between the races, said means comprising a tiltable carrier for each roller, the rollers being each tiltable with reference to the carrier, and means for tilting each roller independently of and relatively to the carrier whereby a tilt can be given the roller for speed changing purposes without requiring the tilting of the carrier, said means comprising a control member adjustable in relation to the carrier and having thereon sets of abutments in opposed relation to opposite faces of the rollers, each set of abutments being mounted for pivotal movement about an axis parallel to that diametric through the points of adhesive contact of the races and the rollers, and in a plane at right angles to the plane of rotation of the rollers.

7. In a device of the character described, a plurality of rotating, axially aligned torque-transmitting members and operative connections between the same comprising a system of coaxial, toric races and rollers in adhesive contact therewith for transmitting torques from one member to the other, means for varying the transmission ratio between the races, said means comprising a tiltable carrier for each roller, the rollers being each tiltable with reference to the carrier, and means for tilting each roller independently of and relatively to the carrier whereby a tilt can be given the roller for speed changing purposes without requiring the tilting of the carrier, said means comprising a control member adjustable in relation to the carrier and having thereon sets of abutments in opposed relation to opposite faces of the rollers, each set of abutments being mounted for pivotal movement about an axis parallel to that diametric through the points of adhesive contact of the races and the rollers, and in a plane at right angles to the plane of rotation of the rollers.

8. In a device of the character described having a plurality of torque transmitting members and an operative connection between the same comprising a system of coaxial, toric races and rollers in adhesive contact therewith for transmitting torques from one member to the other, means for varying the transmission ratio between the races, said means comprising a tiltable carrier for each roller and a journal for tiltably supporting said carrier, the rollers being each adapted for angling with reference to the carrier, and means for angling each roller independently of and relatively to the carrier, whereby the roller can be angled for speed changing operations without tilting of the carrier, said means comprising a control member adjustable in relation to the carrier and a support for pivotally journalling the control member, said support being separate from and independent of the above said journal of the carrier of the roller, said control member having thereon an abutment adapted to engage the roller so as to cause angling thereof about an axis passing through the points of adhesive contact of the roller with the races, and means for operating the said control members, said last named means being so journalled that they are movable relatively to and independently of the said roller carriers.

9. In a power transmission system having a pair of coaxial toric raceways, and rollers therebetween disposed symmetrically around the axis of said raceways and in adhesive contact therewith, whereby power is transmitted from one race to the other, and said rollers being pivotally mounted to vary the speed ratio of the transmission, a torque loading device positioned intermediate one raceway and the power input, a second torque loading device positioned intermediate the other raceway and the load, said torque loading devices being aligned so that the axial thrusts generated thereby are colinear and opposed to each other, the thrust components on the points of adhesive contact between the raceways and each roller due to said torque loading devices being also colinear and opposed to each other and passing through the center of profile of said toric raceways.

10. In a power transmission system a pair of similar rotating races coaxially aligned, and one adapted to function as a driving member and the other as a driven member and said races being each provided with a toric raceway complementary to the raceway of the other race, a set of rollers symmetrically disposed about the axis of the races and in adhesive contact with said raceways, and adapted to rotate so as to transmit power from one race to the other, and a pair of similar torque-loading devices constructed to generate axial pressures always in a fixed proportion to the torque transmitted thereby and adapted to cause axial motion of said races for purposes of maintaining at all times the adhesive contact between said races and rollers, one of said devices being associated with the driving race and the other being similarly associated with the driven race, whereby the parts of said system are disposed symmetrically in relation to a plane perpendicular to the axis of rotation of the races and passing through the centers of the rollers.

11. A variable speed power transmission system of the toric race and roller type having driven and driving toric races in coaxial opposed relation and rollers disposed symmetrically around the axis of said races and in adhesive driving contact therewith for transmitting power therebetween and a torque loading device for generating an axial pressure proportional to the transmitted torque and adapted thereby to maintain the adhesive driving contact between said races and rollers, associated with each end of the system and a support for, each of said torque loading devices, said supports being mounted at each end of the system for free adjustment of the torque loading devices about a center situated on the axis of the said races, said center being one and the same for both supports.

12. In a power transmission mechanism having a driving rotating toric race and a driven rotating toric race coaxial therewith and rollers therebetween and in adhesive contact therewith for transmitting power from one race to the other, means whereby each of said races is mounted to pivot universally about a point located on its axis of rotation, and is free to move axially toward and away from said other race, and a torque loading device associated with each of said races adapted to generate an axial pressure thereon proportional to the torque transmitted and thereby to cause axial motion thereof for the purpose of maintaining adhesive contact between said races and said rollers, and means whereby each of said torque loading devices is adapted for adjusting movement of the parts thereof about a point located on the axis of the races, said point being the same for both torque loading devices.

13. In a power transmission mechanism, a system comprising a pair of rotating coaxial, toric races, rollers disposed symmetrically around the axis of said races and in adhesive driving contact with said races and adapted to transmit torques therebetween, a torque-loading device coaxial with said races positioned intermediate one of the races and a source of power, a second torque-loading device also coaxial with said races, and positioned intermediate the other of said races and a load driven thereby, and a non-yielding thrust bearing associated with each of said torque-loading devices and adapted to furnish the reaction for the axial pressure on said races generated by said torque-loading devices for maintaining the adhesive driving contact between said races and rollers, said thrust bearings being axially aligned with said races and torque-loading devices, and said torque-loading devices having substantially identical characteristics and each developing an axial component which always maintains its proportionality to the load.

14. In a transmission system comprising a system of rotating races and tiltable rollers contacting therewith, for transmitting power therebetween, means for varying the relative speeds of said races comprising sets of abutments in opposed relation to opposite faces of the rollers, each set of abutments being mounted for pivotal movement about an axis parallel to that diametric through the points of adhesive contact of the races and the rollers, and a pair of sets of abutments being coaxially positioned on each side of said rollers but on opposite sides of the axis of rotation thereof, so as to be opposed by a similar pair on the opposite side of said roller.

15. In a system for transmitting power from a rotating driving member to a rotating driven member, in which the transmission is effected by the rolling adhesive contact of rollers with coaxial toric races, a carrier for each of said rollers, a journal for supporting the said carrier for tiltable movement about an axis, each roller being mounted in its carrier so as to be rotatable therein about an axis normally passing through the race axis but adapted to be inclined about an axis passing through the points of contact of the roller with the races, and means for causing such inclination of the roller axis, said means comprising a movable member provided with abutments placed laterally of the roller and effecting its inclination by pushing in a direction substantially perpendicular to the side surface of the roller, and a journalling means for pivotally supporting said last named member, said journalling means being separate from and independent of the above said journals of the tiltable carriers.

16. In a system for transmitting power from a rotating driving member to a rotating driven member, in which the transmission is effected by the rolling adhesive contact of rollers with coaxial toric races, a carrier for each of said rollers, journals for supporting the said carrier for tiltable movement about an axis and adapted to prevent movement of the carrier along its axis of tilting, each roller being mounted in its carrier so as to be rotatable therein about an axis normally passing through the race axis but adapted to be inclined about an axis passing through the points of contact of the roller with the races, and means for causing such inclination of the roller axis, said means comprising a movable member provided with abutments placed laterally of the roller and effecting its inclination by pushing in a direction substantially perpendicular to the side surface of the roller, and a journalling means for pivotally supporting said last named member, said journalling means being separate from and independent of the above said journals of the tiltable carriers.

17. In a device of the character described having a plurality of torque transmitting members and an operative connection between the same comprising a system of coaxial, toric races and rollers in adhesive contact therewith for transmitting torques from one member to the other, means for varying the transmission ratio between the races, said means comprising a tiltable carrier for each roller, the rollers being each adapted for angling with reference to the carrier, and means for angling each roller independently of and relatively to the carrier, whereby the roller can be angled for speed changing operations without tilting of the carrier, said means comprising a control member distinct and separate from the carrier mounted for pivotal movement about the axis of tilt of the carrier and movable independently thereof, and having thereon an abutment so positioned relative to the carrier that the abutment moves in a plane perpendicular to the axis of tilt of the carrier and spaced from the roller axis, whereby it is adapted to engage the roller at a point in advance of the point of adhesive contact between one of the races and the roller.

18. In a system for transmitting power from a rotating driving member to a rotating driven member, in which the transmission is effected by the rolling adhesive contact of rollers with coaxial toric races, a mounting for each of said rollers whereby they are adapted to pivot about a pair of axes perpendicular to each other and one of which passes through the points of contact of the roller with the races, control means for each roller mounted on a movable support positioned exteriorly of the roller mounting so that said control means is movable into and out of contact with the roller at a point in advance of the point of adhesive contact between one of the races and the roller, and mechanism to operate the control means of all of said rollers simultaneously, said mechanism being also positioned exteriorly of the roller mounting, whereby the action of said control means is independent of any reaction of the load upon the rollers.

19. In a system for transmitting power by rolling adhesive contact, said system having a driving member, a driven member, and a pair of races operatively associated with said members, and said races having toric raceways on their opposed faces, and at least one roller between the said toric raceways and contacting therewith, for transmitting power therebetween, a roller, a tiltable roller carrier, means associated therewith for rotatably journalling said roller therein, said journalling means also permitting a relative angling movement between the races and the roller so as to cause the rotational axis of the roller to pass to either side of the race axis during such relative angling movement, control means pivotally mounted exteriorly of the roller carrier and independent of the forces acting on the roller carrier and on the roller, means to move said control means, said control means carrying an abutment thereon so positioned in relation to the roller that as the control means is moved the abutment will move toward or away from the roller and in one of its positions will contact the roller at a point in advance of the contact point of the roller with one of the races, whereby movement of said control means is independent of the load upon the roller carrier.

ALAIN MADLÉ.